US009625187B2

(12) United States Patent
Kawagoe et al.

(10) Patent No.: US 9,625,187 B2
(45) Date of Patent: Apr. 18, 2017

(54) COMBINED AIR-CONDITIONING AND HOT-WATER SUPPLY SYSTEM

(75) Inventors: Tomokazu Kawagoe, Tokyo (JP); Hirofumi Koge, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 339 days.

(21) Appl. No.: 13/881,449

(22) PCT Filed: Dec. 15, 2010

(86) PCT No.: PCT/JP2010/007268
§ 371 (c)(1),
(2), (4) Date: Apr. 25, 2013

(87) PCT Pub. No.: WO2012/081052
PCT Pub. Date: Jun. 21, 2012

(65) Prior Publication Data
US 2013/0213072 A1    Aug. 22, 2013

(51) Int. Cl.
*F25B 30/02* (2006.01)
*F25B 13/00* (2006.01)
*F25B 49/02* (2006.01)

(52) U.S. Cl.
CPC .............. *F25B 30/02* (2013.01); *F25B 13/00* (2013.01); *F25B 49/027* (2013.01);
(Continued)

(58) Field of Classification Search
CPC .... F25B 30/02; F25B 13/00; F25B 2313/003; F25B 2500/27; F25B 2600/2513;
(Continued)

(56) References Cited

U.S. PATENT DOCUMENTS 4,206,872 A * 6/1980 Levine .................. G05D 23/24
                                                    165/268
4,367,634 A * 1/1983 Bolton ..................... 62/238.6
(Continued)

FOREIGN PATENT DOCUMENTS

EP      1 167 896 A2     2/2002
EP      1972871 A2       9/2008
(Continued)

OTHER PUBLICATIONS

International Search Report of the International Searching Authority mailed Mar. 1, 2011 for the corresponding international application No. PCT/JP2010/007268 (with English translation).
(Continued)

*Primary Examiner* — Len Tran
*Assistant Examiner* — Kirstin Oswald
(74) *Attorney, Agent, or Firm* — Posz Law Group, PLC

(57) ABSTRACT

A combined air-conditioning and hot-water supply system that, if a temperature that is set in a hot-water supply unit is higher than a temperature of refrigerant discharged from a compressor when the combined air-conditioning and hot-water supply system is in a heating operation cycle state, increases a target condensing temperature of an outdoor unit above the target condensing temperature that has been set, and controls an opening degree of an indoor expansion device to be less than the opening degree that has been set, such that a heating load of an indoor unit is maintained constant.

9 Claims, 5 Drawing Sheets

(52) U.S. Cl.
CPC .................. *F25B 2313/003* (2013.01); *F25B 2313/02334* (2013.01); *F25B 2313/02741* (2013.01); *F25B 2500/27* (2013.01); *F25B 2600/0253* (2013.01); *F25B 2600/23* (2013.01); *F25B 2600/2513* (2013.01); *Y02B 30/741* (2013.01)

(58) Field of Classification Search
CPC ................ F25B 2600/23; F25B 49/027; F25B 2600/0253; F25B 2313/02741; F25B 2313/02334; F24H 4/02; H24F 5/00; Y02B 30/741
USPC .............................................. 62/228.3, 238.6
See application file for complete search history.

(56) References Cited

U.S. PATENT DOCUMENTS

| | | | | |
|---|---|---|---|---|
| 4,481,788 A | * | 11/1984 | Yoshino | F24D 17/02 236/91 C |
| 4,507,936 A | * | 4/1985 | Yoshino | F24D 11/0221 126/573 |
| 4,592,206 A | * | 6/1986 | Yamazaki et al. | 62/160 |
| 4,635,445 A | * | 1/1987 | Otsuka | F24F 3/0442 165/217 |
| 4,878,357 A | * | 11/1989 | Sekigami | F24F 3/065 62/160 |
| 5,023,432 A | * | 6/1991 | Boykin | G05D 23/1904 219/483 |
| 5,025,638 A | * | 6/1991 | Yamagishi | F24F 3/044 236/49.3 |
| 5,097,671 A | * | 3/1992 | Jeong-Hun | F24F 11/0009 236/51 |
| 5,224,353 A | * | 7/1993 | Nagasawa | F24F 11/00 236/51 |
| 7,640,763 B2 | | 1/2010 | Nishimura et al. | |
| 2002/0000094 A1 | * | 1/2002 | Kuroki et al. | 62/197 |
| 2002/0002834 A1 | * | 1/2002 | Kuroki et al. | 62/238.6 |
| 2002/0002934 A1 | * | 1/2002 | Nungesser | B01F 13/1055 106/436 |
| 2002/0014085 A1 | * | 2/2002 | Sakakibara | F25B 9/008 62/201 |
| 2005/0066678 A1 | * | 3/2005 | Kamimura | F25B 29/003 62/238.7 |
| 2005/0189431 A1 | * | 9/2005 | Nakayama et al. | 237/12 |
| 2006/0096306 A1 | * | 5/2006 | Okaza et al. | 62/228.1 |
| 2006/0213209 A1 | * | 9/2006 | Tanaami | F24D 19/1054 62/238.6 |
| 2006/0218948 A1 | * | 10/2006 | Otake | F25B 9/008 62/160 |
| 2007/0199337 A1 | * | 8/2007 | Otake | F24D 17/02 62/183 |
| 2007/0234752 A1 | * | 10/2007 | Otake | F25B 29/003 62/324.6 |
| 2008/0245084 A1 | * | 10/2008 | Song | F24F 11/0079 62/158 |
| 2009/0019884 A1 | * | 1/2009 | Sekine et al. | 62/515 |
| 2009/0151388 A1 | * | 6/2009 | Platt et al. | 62/498 |
| 2009/0199581 A1 | * | 8/2009 | Ushijima | F25B 30/02 62/238.7 |
| 2010/0186604 A1 | * | 7/2010 | Otake | F25B 29/003 99/455 |
| 2010/0236498 A1 | * | 9/2010 | Komori | F24D 11/0228 122/19.1 |
| 2010/0287964 A1 | * | 11/2010 | Okamoto | 62/224 |
| 2011/0154844 A1 | * | 6/2011 | Lee et al. | 62/278 |

FOREIGN PATENT DOCUMENTS

| | | |
|---|---|---|
| EP | 2182306 A1 | 5/2010 |
| EP | 2224180 A1 | 9/2010 |
| JP | 06-018123 A | 1/1994 |
| JP | 2006-017376 A | 1/2006 |
| JP | 2006-283989 A | 10/2006 |
| WO | 2009/098751 A1 | 8/2009 |
| WO | 2010/098069 A1 | 9/2010 |
| WO | 2010/113372 A1 | 10/2010 |

OTHER PUBLICATIONS

Extended European Search Report mailed May 2, 2014 for the corresponding EP application No. 10860663.3 (English).

Office Action dated Feb. 10, 2017 issued in corresponding EP patent application No. 10 860 663.3.

* cited by examiner

COMBINED AIR-CONDITIONING AND HOT-WATER SUPPLY SYSTEM

CROSS REFERENCE TO RELATED APPLICATION

This application is a U.S. national stage application of PCT/JP2010/007268 filed on Dec. 15, 2010.

TECHNICAL FIELD

The present invention relates to a combined air-conditioning and hot-water supply system that is equipped with a heat pump cycle and is capable of simultaneously providing an air conditioning load and a hot water load.

BACKGROUND ART

There have been proposed combined air-conditioning and hot-water supply systems that are equipped with a heat pump cycle and are capable of simultaneously providing an air conditioning load and a hot water load. As one of such systems, there has been a combined air-conditioning and hot-water supply system capable of simultaneously providing a cooling load, a heating load, and a hot water load with such a configuration that a hot-water supply refrigerant system including a compressor, a water heat exchanger, an expansion device, and a refrigerant-to-refrigerant heat exchanger is cascade-connected to part of a condenser of an air-conditioning refrigerant system including a compressor, an outdoor heat exchanger, an expansion device, an indoor heat exchanger, and an accumulator (see Patent Literature 1, for example).

There has also been disclosed a combined air-conditioning and hot-water supply system that "includes an outdoor unit having a compressor configured to compress refrigerant, a plurality of indoor units connected to the outdoor unit and configured to condition air, a water heater connected to the outdoor unit and configured to supply hot water, operation detecting means that detects an operational states of each of the plurality of indoor units, and controlling means that controls the operating capacity of the compressor in accordance with the detection results of the operation detecting means while maintaining a predetermined operating capacity required by the water heater" (see Patent Literature 2, for example).

CITATION LIST

Patent Literature

Patent Literature 1: International Publication No. 2009-098751 (e.g., Page 1, FIG. 1)
Patent Literature 2: Japanese Patent Application No. 6-18123 (e.g., Page 1, FIG. 2)

SUMMARY OF INVENTION

Technical Problem

An air-conditioning and hot-water supply system disclosed in Patent Literature 1 has a refrigeration cycle including an outdoor unit, a hot-water supply unit, and an indoor unit, which are connected to each other. The air-conditioning and hot-water supply system is provided with a single refrigerant system which can supply high-temperature hot water by being cascade-connected to the hot-water supply unit, and thus the combined air-conditioning and hot-water supply system can supply high-temperature hot water. However, with this refrigerant cycle configuration, the costs necessary for the hot-water supply unit become very high.

On the other hand, an air-conditioning and hot-water supply system disclosed in Patent Literature 2 can be achieved at a lower cost than the technique of Patent Literature 1. However, the refrigerant condensing temperature is set in accordance with the air conditioning load, and hence the hot-water supply temperature of the hot-water-supply side cannot be set high.

Furthermore, in the combined air-conditioning and hot-water supply systems of Patent Literature 1 and Patent Literature 2, each of the outdoor unit, the indoor unit, and the hot-water supply unit normally performs control operation autonomously and distributedly. Therefore, in the case where the refrigerant condensing temperature is set in accordance with the hot water load, the pressure of the refrigerant might be excessively increased upon starting and stopping the indoor unit or the hot-water supply unit in response to a load variation.

The present invention has been made to overcome the above problems, and aims to provide a combined air-conditioning and hot-water supply system capable of supplying high-temperature hot water from a hot-water-supply side and capable of preventing an excessive increase in pressure of refrigerant.

Solution to Problem

A combined air-conditioning and hot-water supply system according to the present invention includes: at least one outdoor unit including a compressor and an outdoor heat exchanger; at least one indoor unit connected to the outdoor unit, the indoor unit including an indoor heat exchanger and an indoor expansion device; and at least one hot-water supply unit connected to the outdoor unit so as to be arranged in parallel to the indoor unit, the hot-water supply unit including a refrigerant-to-water heat exchanger and a hot-water-supply-side expansion device, the combined air-conditioning and hot-water supply system being operated so as to achieve a target condensing temperature that is set in the outdoor unit, wherein, when the indoor unit performs a heating operation and the hot-water supply unit performs a hot-water supply operation, if a temperature that is set in the hot-water supply unit is higher than a temperature of refrigerant discharged from the compressor, the target condensing temperature of the outdoor unit is increased above the target condensing temperature that has been set, and an opening degree of the indoor expansion device is controlled to be less than the opening degree that has been set, such that a heating load of the indoor unit is maintained constant.

Advantageous Effects of Invention

According to a combined air-conditioning and hot-water supply system of the present invention, it is possible to control the capacity at the hot-water-supply side and maintain a preset temperature high in the case where a preset temperature in a hot-water supply unit is high.

DESCRIPTION OF EMBODIMENTS

An embodiment of the present invention will be described with reference to the drawings.

Figure 1:
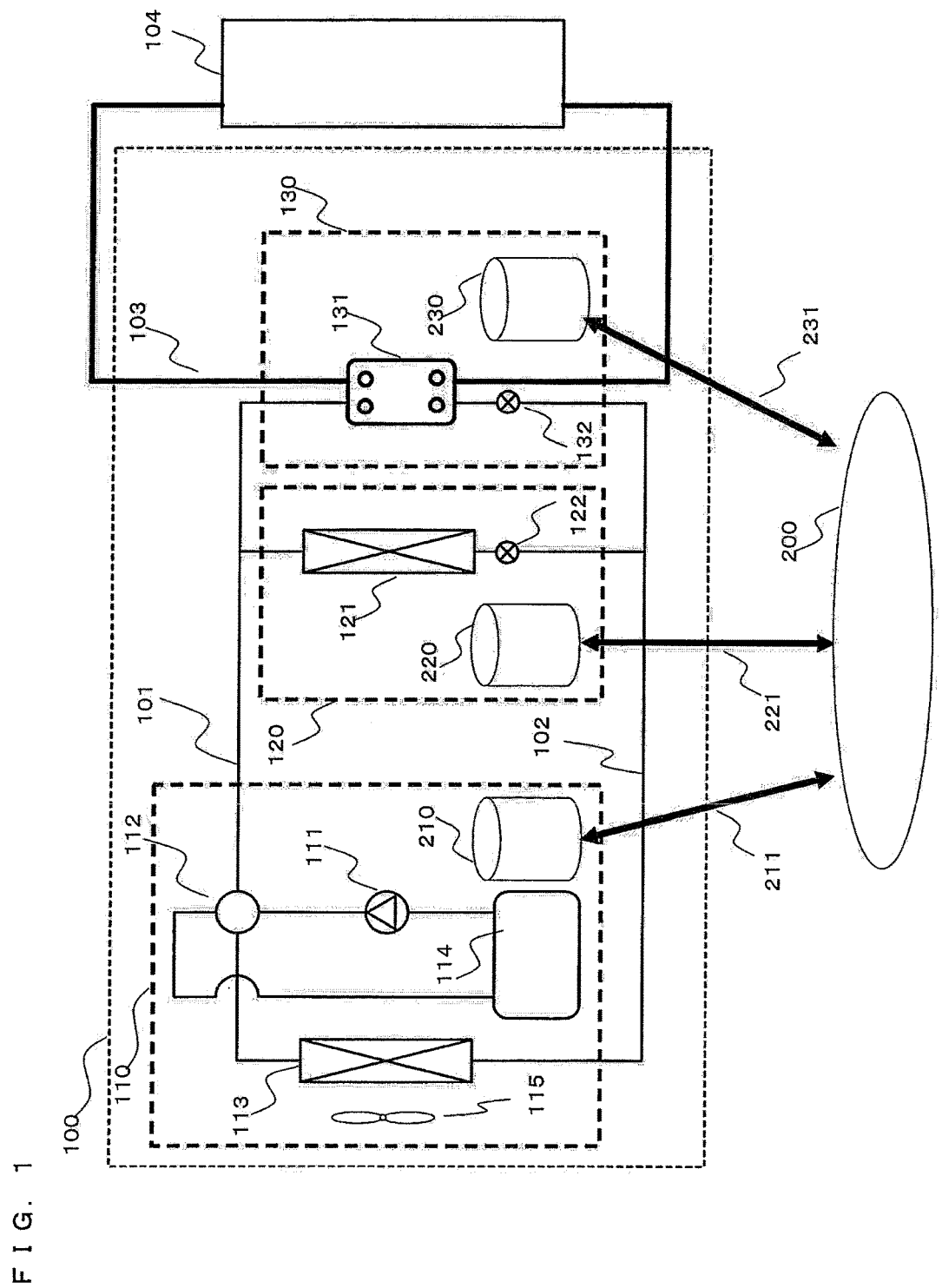
FIG. 1 is a refrigerant circuit diagram illustrating an exemplary refrigerant circuit configuration of a combined air-conditioning and hot-water supply system according to Embodiment of the present invention.

FIG. 1 is a refrigerant circuit diagram illustrating an exemplary refrigerant circuit configuration of a combined air-conditioning and hot-water supply system 100 according to Embodiment of the present invention. The configuration and operation of the combined air-conditioning and hot-water supply system 100 will be described with reference to FIG. 1. It should be noted that the relationship between the sizes of components shown in FIG. 1 and the subsequent drawings may differ from the relationship between the actual sizes of the components.

The combined air-conditioning and hot-water supply system 100 is installed in a building, an apartment, a hotel, or the like, and is capable of simultaneously providing a cooling load, a heating load, and a hot water load using a refrigeration cycle (heat pump) that circulates refrigerant. The combined air-conditioning and hot-water supply system 100 includes an outdoor unit 110, an indoor unit 120, and a hot-water supply unit 130, which are connected to each other. Among these components, the indoor unit 120 and the hot-water supply unit 130 are connected in parallel to the outdoor unit 110 which serves as a heat source unit.

The outdoor unit 110, the indoor unit 120, and the hot-water supply unit 130 are connected by a gas main pipe 101, serving as a refrigerant pipe, and a liquid main pipe 102, serving as a refrigerant pipe, so as to communicate with each other. Further, a water pipe 103 is connected to the hot-water supply unit 130 so as to supply water thereto. The hot-water supply unit 130 is capable of heating or cooling the supplied water.

[Outdoor Unit 110]

The outdoor unit 110 has a function of supplying heating energy or cooling energy to the indoor unit 120 and the hot-water supply unit 130. In a refrigeration cycle configuration during a heating operation, this outdoor unit 110 has a circuit configuration in which an outdoor heat exchanger 113, a switching valve 112, an accumulator 114, a compressor 111, and the switching valve 112 are sequentially connected from the liquid main pipe 102 side to the gas main pipe 101. In the outdoor unit 110, an air-sending device 115 such as a fan for supplying air to the outdoor heat exchanger 113 is disposed near the outdoor heat exchanger 113.

The compressor 111 is configured to suction the refrigerant flowing through the liquid main pipe 102, and compress the refrigerant to a high-temperature and high-pressure state. The compressor 111 may be one capable of compressing the suctioned refrigerant to a high-pressure state, and is not limited to a particular type of compressor. For example, the compressor 111 may be any of various types of compressors, such as a reciprocal compressor, a rotary compressor, a scroll compressor, and a screw compressor. This compressor 111 may preferably be of a type whose rotation speed can be variably controlled by an inverter.

The switching valve 112 may be a four-way valve, for example, and is configured to switch the flow of refrigerant in accordance with a requested operation mode. The outdoor heat exchanger 113 is configured to function as a radiator (condenser) in a cooling cycle, and function as an evaporator in a heating cycle. The outdoor heat exchanger 113 exchanges heat between the air supplied from the air-sending device 115 and the refrigerant so as to condense and liquefy the refrigerant or evaporate and gasify the refrigerant. The heat exchange amount of the outdoor heat exchanger 113 can be adjusted by controlling the rotation speed of the air-sending device 115, which is disposed near the outdoor heat exchanger 113, using an inverter or the like. The accumulator 114 is disposed on the suction side of the compressor 111, and is configured to store excess refrigerant. It is to be noted that the accumulator 114 may be any container capable of storing excess refrigerant.

[Indoor Unit 120]

The indoor unit 120 has a function of receiving heating energy or cooling energy from the outdoor unit 110 so as to handle heating load or cooling load. The indoor unit 120 includes an indoor expansion device 122 and an indoor heat exchanger 121, which are connected in series to each other. It is to be noted that, although only one indoor unit 120 is provided in the example of FIG. 1, the number of indoor units is not particularly limited. A plurality of indoor units may be provided in the same manner as the indoor unit 120. Further, in the indoor unit 120, an air-sending device such as a fan for supplying air to the indoor heat exchanger 121 may be provided near the indoor heat exchanger 121.

The indoor expansion device 122 serves as a reducing valve and an expansion valve, and is configured to reduce the pressure of the refrigerant so as to expand the refrigerant. This indoor expansion device 122 may be a device whose opening degree is variably controllable. Examples of such devices include precise flow control means such as an electronic expansion valve, and inexpensive refrigerant flow control means such as a capillary tube. The indoor heat exchanger 121 is configured to function as a radiator (condenser) in a heating cycle, and function as an evaporator in a cooling cycle. The indoor heat exchanger 121 exchanges heat between the air supplied from an air-sending device (not shown) and the refrigerant so as to condense and liquefy the refrigerant or evaporate and gasify the refrigerant.

[Hot-Water Supply Unit 130]

The hot-water supply unit 130 has a function of supplying heating energy or cooling energy from the outdoor unit 110 to a water circuit 104 through a refrigerant-to-water heat exchanger 131. The hot-water supply unit 130 includes the refrigerant-to-water heat exchanger 131 and a hot-water-supply-side expansion device 132, which are connected in series to each other. It is to be noted that although only one hot-water supply unit 130 is provided in the example of FIG. 1, the number of hot-water supply units is not particularly limited. Further, the hot-water-supply-side expansion device 132 has the same function as the indoor expansion device 122.

The refrigerant-to-water heat exchanger 131 exchanges heat between the water flowing through the water pipe 103 and the refrigerant flowing through a refrigerant pipe. The water pipe 103 is connected to the water circuit 104. The water is heated or cooled by the refrigerant-to-water heat exchanger 131 and is supplied to the water circuit 104 so as to be used as hot water or cold water. The water circuit 104 includes a pump and a hot-water storage tank (both not shown). In other words, the water circuit 104 is established by circulating water heated or cooled by the refrigerant-to-water heat exchanger 131 through the water pipe 103. It is to be noted that the water pipe 103 may include a copper pipe, a stainless steel pipe, a steel pipe, and a vinyl chloride pipe. While the heat medium circulating through the water pipe is water in the above example, the heat medium is not limited to water. Antifreeze or the like may be circulated.

As described above, in the combined air-conditioning and hot-water supply system 100, the compressor 111, the switching valve 112, the indoor heat exchanger 121, the indoor expansion device 122, and the outdoor heat exchanger 113 are connected in series to each other. Also, the compressor 111, the switching valve 112, the refrigerant-to-water heat exchanger 131, the hot-water-supply-side expansion device 132, and the outdoor heat exchanger 113 are connected in series to each other. Further, the indoor heat exchanger 121 and the refrigerant-to-water heat exchanger 131 are connected in series. Thus, a refrigeration cycle for circulating refrigerant is formed.

[Operations]

Operation modes of the combined air-conditioning and hot-water supply system 100 include a cooling operation mode in which all the indoor units 120 operating in a cooling operation cycle state perform a cooling operation and all the operating hot-water supply units 130 perform a cold water operation, and a heating operation mode in which all the indoor units 120 operating in a heating operation cycle state perform a heating operation and all the operating hot-water supply units 130 perform a hot-water supply operation.

[Cooling Operation Mode]

A low-pressure gas refrigerant is suctioned into the compressor 111. The refrigerant is compressed into a high-temperature high-pressure refrigerant in the compressor 111, is discharged from the compressor 111, and flows into the outdoor heat exchanger 113 via the switching valve 112. The high-pressure gas refrigerant that has flowed into the outdoor heat exchanger 113 transfers heat by exchanging heat with the air supplied from the air-sending device 115 so as to turn into a high-pressure liquid refrigerant, and flows out of the outdoor unit 110 through the liquid main pipe 102. The high-pressure liquid refrigerant that has flowed out of the outdoor unit 110 flows into the indoor unit 120 and the hot-water supply unit 130. The refrigerant that has flowed into the indoor unit 120 is subjected to pressure reduction by the indoor expansion device 122 so as to turn into a low-pressure two-phase gas-liquid refrigerant or a low-pressure liquid refrigerant, and flows into the indoor heat exchanger 121. Meanwhile, the refrigerant that has flowed into the hot-water supply unit 130 is subjected to pressure reduction by the hot-water-supply-side expansion device 132 so as to turn into a low-pressure two-phase gas-liquid refrigerant or a low-pressure liquid refrigerant, and flows into the refrigerant-to-water heat exchanger 131.

The low-pressure refrigerant that has flowed into the indoor heat exchanger 121 is evaporated in the indoor heat exchanger 121 so as to turn into a low-pressure gas refrigerant, and flows out of the indoor heat exchanger 121. Meanwhile, the refrigerant that has flowed into the refrigerant-to-water heat exchanger 131 is evaporated in the refrigerant-to-water heat exchanger 131 so as to turn into a low-pressure gas refrigerant, and flows out of the refrigerant-to-water heat exchanger 131. The low-pressure gas refrigerant that has flowed out of the indoor heat exchanger 121 and the refrigerant-to-water heat exchanger 131 flows into the outdoor unit 110 through the gas main pipe 101. The low-pressure gas refrigerant that has flowed into the outdoor unit 110 passes through the switching valve 112 and the accumulator 114, and is suctioned into the compressor 111 again.

[Heating Operation Mode]

A low-pressure gas refrigerant is suctioned into the compressor 111. The refrigerant is compressed into a high-temperature high-pressure refrigerant in the compressor 111, is discharged from the compressor 111, passes through the switching valve 112 and the gas main pipe 101, and flows out of the outdoor unit 110. The high-pressure gas refrigerant that has flowed out of the outdoor unit 110 flows into the indoor unit 120 and the hot-water supply unit 130. The refrigerant that has flowed into the indoor unit 120 flows into the indoor heat exchanger 121. Meanwhile, the refrigerant that has flowed into the hot-water supply unit 130 flows into the refrigerant-to-water heat exchanger 131. The high-pressure gas refrigerant that has flowed into the indoor heat exchanger 121 is condensed (transfers heat) in the indoor heat exchanger 121 so as to turn into a high-pressure liquid refrigerant, and flows out of the indoor heat exchanger 121. Meanwhile, the high-pressure gas refrigerant that has flowed into the refrigerant-to-water heat exchanger 131 is condensed (transfers heat) in the refrigerant-to-water heat exchanger 131 so as to turn into a high-pressure liquid refrigerant, and flows out of the refrigerant-to-water heat exchanger 131.

The high-pressure liquid refrigerant that has flowed out of the indoor heat exchanger 121 is subjected to pressure reduction by the indoor expansion device 122 so as to turn into a low-pressure two-phase gas-liquid refrigerant or a low-pressure liquid refrigerant, and flows out of the indoor unit 120 through the liquid main pipe 102. Meanwhile, the high-pressure refrigerant that has flowed out of the refrigerant-to-water heat exchanger 131 is subjected to pressure reduction by the hot-water-supply-side expansion device 132 so as to turn into a low-pressure two-phase gas-liquid refrigerant or a low-pressure liquid refrigerant, and flows out of the hot-water supply unit 130 through the liquid main pipe 102. The low-pressure refrigerant that has flowed out of the indoor unit 120 and the hot-water supply unit 130 flows into the outdoor unit 110 through the liquid main pipe 102, and flows into the outdoor heat exchanger 113. The low-pressure refrigerant that has flowed into the outdoor heat exchanger 113 exchanges heat with the air supplied from the air-sending device 115 so as to turn into a low-pressure gas refrigerant, and flows out of the outdoor heat exchanger 113. The refrigerant that has flowed out of the outdoor heat exchanger 113 passes through the switching valve 112 and the accumulator 114, and is suctioned into the compressor 111 again.

Incidentally, the combined air-conditioning and hot-water supply system 100 includes control means 200. This control means 200 has a function of controlling the entire operation of the combined air-conditioning and hot-water supply system 100, and includes outdoor unit control means 210, indoor unit control means 220, and hot-water supply unit control means 230.

With regard to allocation of the control means, control means may be provided one for each of the units, and autonomous distributed cooperative control may be employed such that the units perform control independently of each other. Alternatively, one of the units may have all the control means such that the unit having all the control means sends a control command to other units by means of communication or the like. For example, as illustrated in FIG. 1, the outdoor unit 110 may include the outdoor unit control means 210; the indoor unit 120 may include the indoor unit control means 220; and the hot-water supply unit 130 may include the hot-water supply unit control means 230. Thus, the outdoor unit 110, the indoor unit 120, and the hot-water supply unit 130 can perform control independently of each other. The control means can transmit information to each other by wireless or wired communication means (communication means 211, communication means 221, and communication means 231).

The outdoor unit control means 210 has a function of controlling a pressure state and a temperature state of the refrigerant in the outdoor unit 110. More specifically, the outdoor unit control means 210 has functions of controlling the operating frequency of the compressor 111, controlling the fan rotation speed of the air-sending device 115, and switching the switching valve 112.

The indoor unit control means 220 has functions of controlling the degree of superheat of the indoor unit 120 during the cooling operation, and controlling the degree of subcooling of the indoor unit 120 during the heating operation. More specifically, the indoor unit control means 220 has functions of changing the area of heat exchange in the indoor heat exchanger 121, controlling the fan rotation speed of the air-sending device (not shown), and controlling the opening degree of the indoor expansion device 122.

The hot-water supply unit control means 230 has functions of controlling the degree of superheat of the hot-water supply unit 130 during the cold water operation, and controlling the degree of subcooling of the hot-water supply unit 130 during the hot-water supply operation. More specifically, the hot-water supply unit control means 230 has functions of controlling the opening degree of the hot-water-supply-side expansion device 132, and controlling a three-way valve, a pump, or the like. Although not shown in FIG. 1, these components are provided in the water circuit 104 in the hot-water supply unit 130 for controlling the water flow rate.

Although not illustrated, the combined air-conditioning and hot-water supply system 100 may further include a sensor that detects a discharge pressure of the refrigerant, a sensor that detects a suction pressure of the refrigerant, a sensor that detects a discharge temperature of the refrigerant, a sensor that detects a suction temperature of the air-conditioning refrigerant, sensors that detect temperatures of the refrigerant flowing into and the refrigerant flowing out of the outdoor heat exchanger 113, a sensor that detects a temperature of outside air taken into the outdoor unit 110, sensors that detect temperatures of the refrigerant flowing into and the refrigerant flowing out of the indoor heat exchanger 121, and a sensor that detects a temperature of water stored in the hot-water storage tank (not shown). Information (measurement information, such as temperature information and pressure information) obtained by these various sensors is transmitted to the control means 200 and is used to control each actuator (drive units for the compressor 111, the switching valve 112, the air-sending device 115, the indoor expansion device 122, the hot-water-supply-side expansion device 132, etc.).

Figure 2:
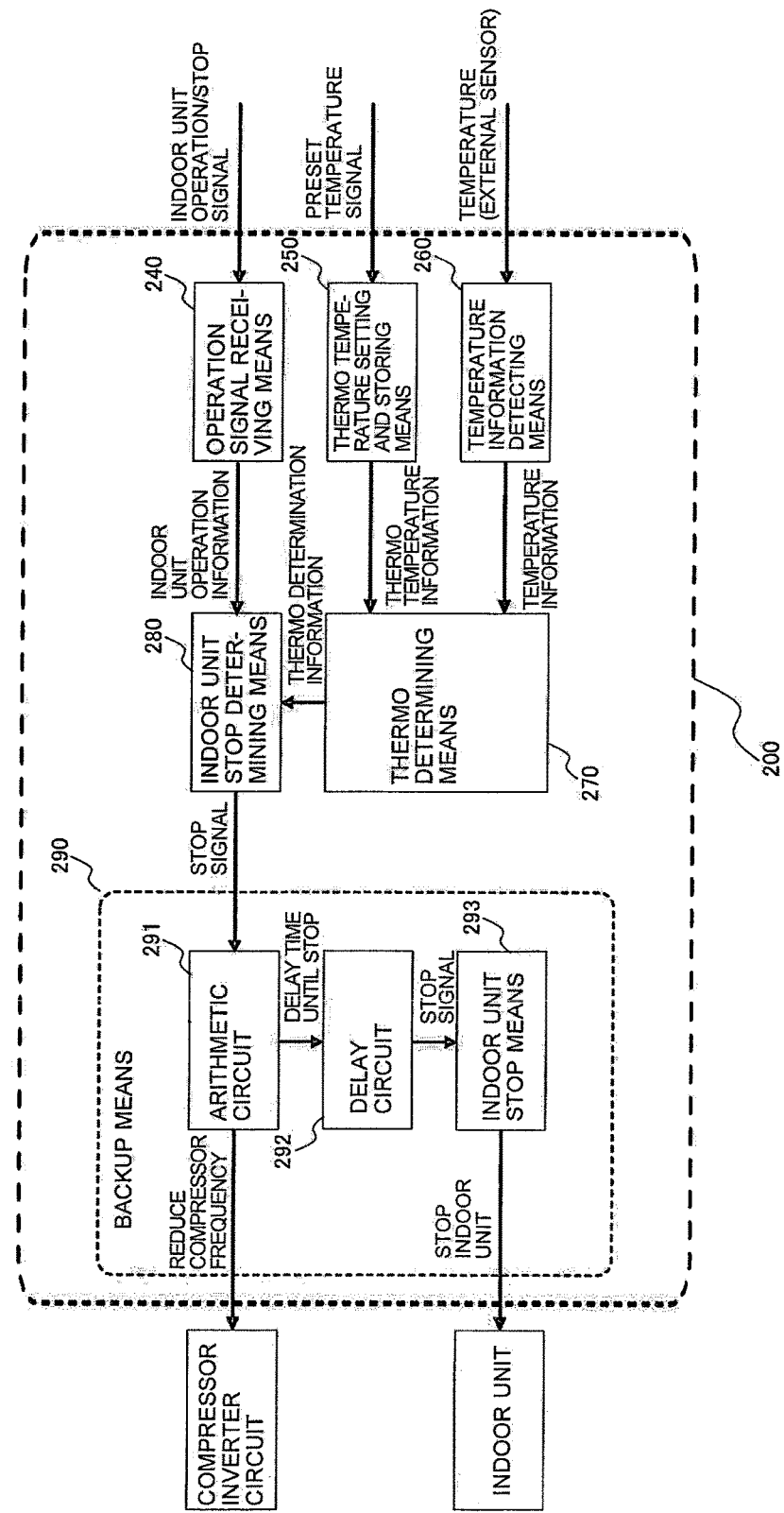
FIG. 2 is a block diagram illustrating a control system of the combined air-conditioning and hot-water supply system according to Embodiment of the present invention.
Figure 3:
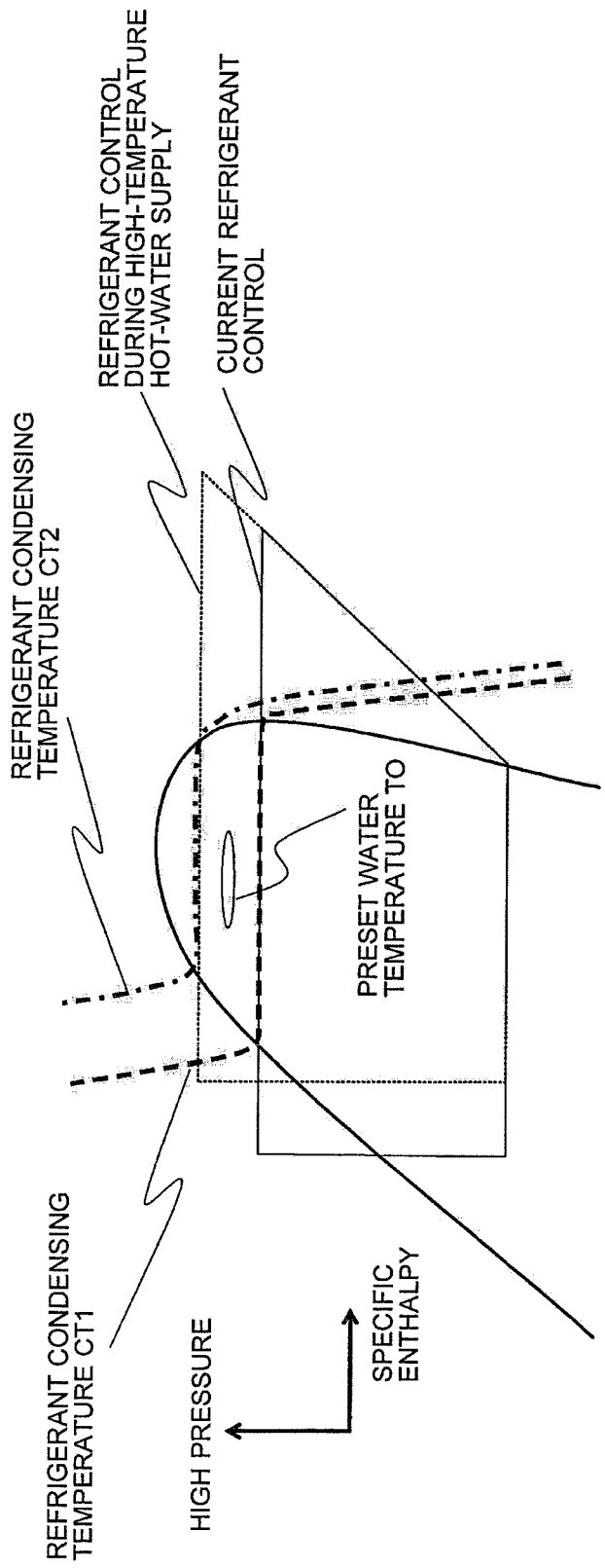
FIG. 3 is a P-h diagram illustrating transition of the refrigerant state in a refrigerant system.
Figure 4:
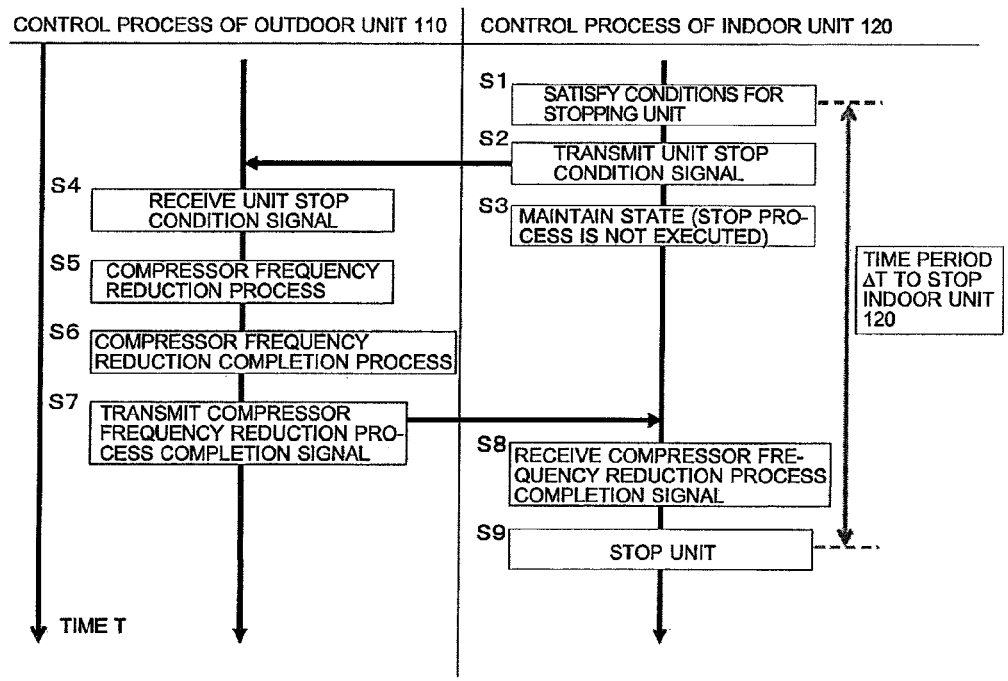
FIG. 4 is a flowchart illustrating exemplary flows of control operations performed by the combined air-conditioning and hot-water supply system according to Embodiment of the present invention.
Figure 4:
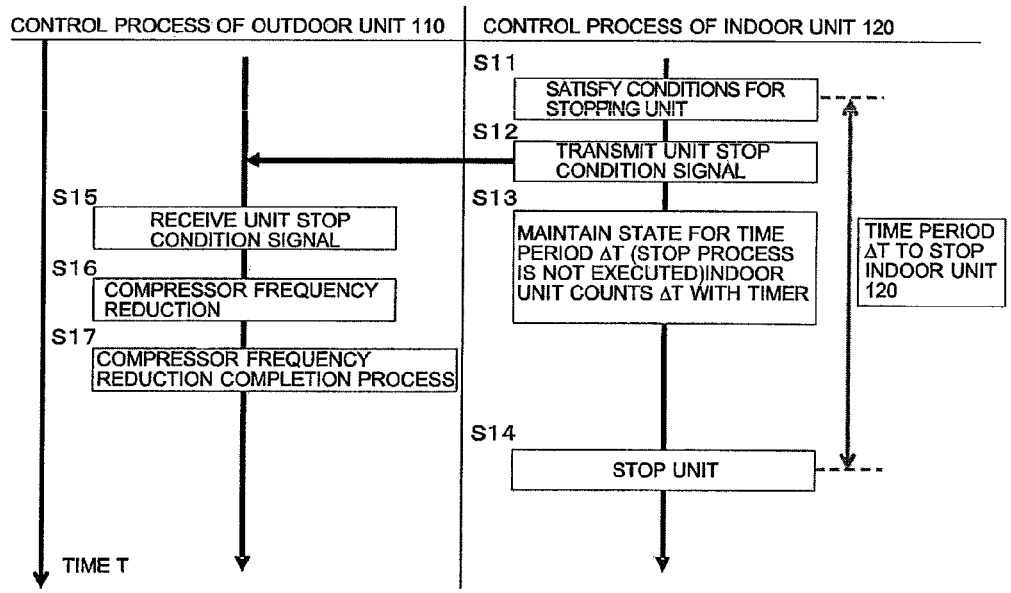
Figure 5:
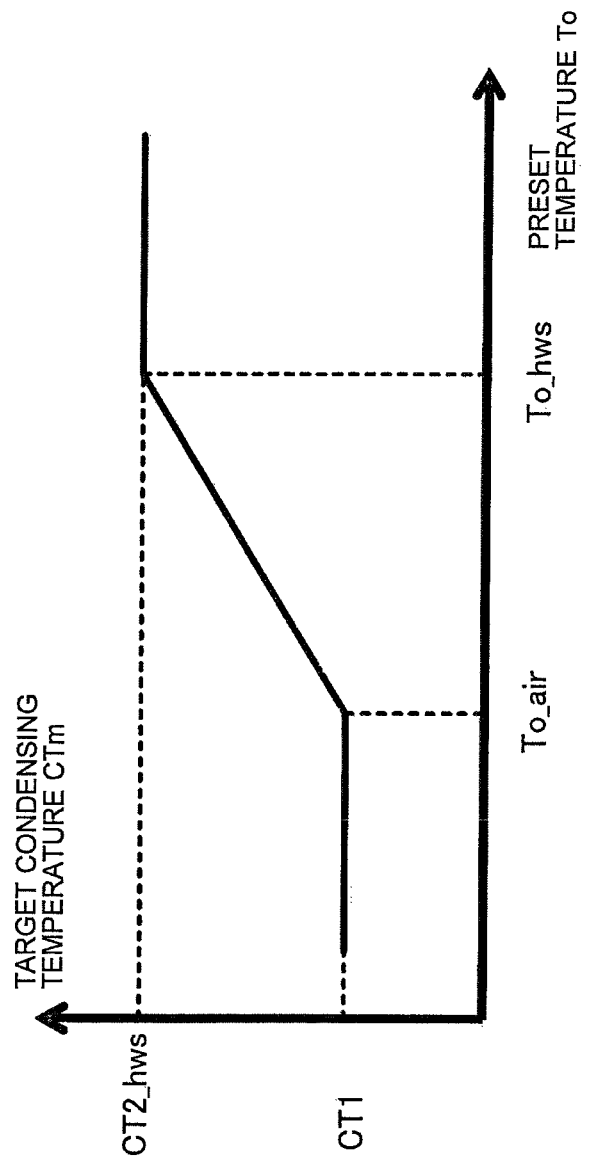
FIG. 5 is a graph illustrating an exemplary setting of a target condensing temperature.

FIG. 2 is a control block diagram illustrating a control system of the combined air-conditioning and hot-water supply system 100. FIG. 3 is a P-h diagram illustrating transition of the refrigerant state in a refrigerant system. FIG. 4 is a flowchart illustrating exemplary flows of control operations performed by the combined air-conditioning and hot-water supply system 100. FIG. 5 is a graph illustrating an exemplary setting of a target condensing temperature. The control system executed by the combined air-conditioning and hot-water supply system 100 will be described in detail with reference to FIGS. 2 through 5. It is to be noted that the flowchart of FIG. 4 illustrates flows of two delay processes performed upon stopping the indoor unit 120. Although FIGS. 2 and 4 illustrate stopping the indoor unit 120, the same applies to the hot-water supply unit 130.

Referring to FIG. 2, the control means 200 is formed of a microcomputer, a DSP, or the like, and includes an operation signal receiving means 240, a thermo temperature setting and storing means 250, temperature information detecting means 260, thermo determining means 270, indoor unit stop determining means 280, and backup means 290. The backup means 290 includes an arithmetic circuit 291, a delay circuit 292, and an indoor unit stopping means 293.

The operation signal receiving means 240 serves as receiving means for receiving operation and stop signals of the indoor unit 120, which are transmitted from the indoor unit control means 220 through the communication means 221. The information (indoor unit operation information) that has been input to this operation signal receiving means 240 is transmitted to the indoor unit stop determining means 280. The thermo temperature setting and storing means 250 serves as receiving means for receiving a preset temperature signal of the indoor unit 120, which is transmitted from the indoor unit control means 220 through the communication means 221. The information (thermo temperature information) that has input to the thermo temperature setting and storing means 250 is transmitted to the thermo determining means 270. The temperature information detecting means 260 serves as receiving means for receiving temperature information of the indoor unit 120, which is obtained by a temperature sensor (not shown) and is transmitted from the indoor unit control means 220 through the communication means 221. The information (temperature information) that has input to the temperature information detecting means 260 is transmitted to the thermo determining means 270.

The thermo determining means 270 has a function of determining the temperature state of the indoor unit 120, on the basis of the thermo temperature information transmitted from the thermo temperature setting and storing means 250, and the temperature information transmitted from the temperature information detecting means 260. Information determined by the thermo determining means 270 is transmitted as thermo determination information to the indoor unit stop determining means 280. The indoor unit stop determining means 280 has a function of determining whether to stop the target indoor unit 120, on the basis of the indoor unit operation information transmitted from the operation signal receiving means 240, and the thermo determination information transmitted from the thermo determining means 270. Information determined by the indoor unit stop determining means 280 is transmitted as a stop signal to the backup means 290.

The arithmetic circuit 291 has functions of determining the operating frequency of the compressor 111 and delaying the time to stop the indoor unit 120, on the basis of the stop signal transmitted from the indoor unit stop determining means 280. Information (e.g., compressor frequency reduction information and delay time information for delaying stopping the indoor unit 120) calculated by the arithmetic circuit 291 is transmitted to the compressor 111, an inverter circuit (not shown), or the delay circuit 292. The delay circuit 292 has a function of delaying stopping the indoor unit 120 on the basis of the delay time information for delaying stopping the indoor unit 120 which is transmitted from the arithmetic circuit 291. That is, the delay circuit 292 has a function of diverting the stop signal transmitted from the indoor unit stop determining means 280 so as to delay input to the indoor unit stopping means 293.

The indoor unit stopping means 293 has a function of stopping the target indoor unit 120 on the basis of the stop signal transmitted via the delay circuit 292. More specifically, the indoor unit stopping means 293 outputs an indoor unit stop command to the target indoor unit 120 on the basis of the stop signal, which is transmitted from the indoor unit stop determining means 280 via the arithmetic circuit 291 and the delay circuit 292 and is input after a lapse of the delay time determined by the arithmetic circuit 291.

A control operation in the heating operation mode will be described on the basis of the configuration described above.

When in the heating operation mode, in order to converge the condensing temperature in the combined air-conditioning and hot-water supply system 100 to an arbitrarily set target value, the outdoor unit control means 210 changes the operating frequency of the compressor 111. Further, when in the heating operation mode, in order to converge the evaporating temperature in the combined air-conditioning and hot-water supply system 100 to an arbitrarily set target value, the outdoor unit control means 210 changes the heat exchange capacity of the outdoor heat exchanger 113. It is to be noted that a control command is determined on the basis of the measurement information (e.g., pressure information and temperature information) obtained from the outdoor unit 110. In the following description, it is assumed that the outdoor unit control means 210, the indoor unit control means 220, and the hot-water supply unit control means 230 perform control independently of each other, for example.

Under the usual control in the heating operation mode, in the case where all the operating indoor units 120 perform a heating operation; all the operating hot-water supply units 130 perform hot-water supply operation; and the hot-water supply temperature set in the hot-water supply unit 130 is higher than the refrigerant temperature (for example, the refrigerant temperature is 50° C. and the preset temperature of the hot-water supply unit 130 is 55° C.), the hot-water supply temperature required by the water circuit 104 cannot achieve the preset temperature.

Also, as illustrated in FIG. 3, in the case of controlling the compressor 111 to increase the refrigerant circulation so as to satisfy a refrigerant condensing temperature CT2 of the combined air-conditioning and hot-water supply system 100>a preset temperature TO, an excessive amount of refrigerant flows into the indoor unit 120, so that the capacity of the indoor unit 120 becomes excessively high. Accordingly, switching between thermo-ON and thermo-OFF is frequently repeated in the indoor unit 120, so that hunting occurs in the high-pressure side of the refrigerant. Thus, the pressure is excessively increased, which may result in abnormal stop of the outdoor unit 110. Furthermore, in this case, the hot-water supply capacity of the hot-water supply unit 130 decreases, so that the hot-water supply temperature does not increase. Thus, the hot-water supply temperature of the hot-water supply unit 130 does not reach the preset temperature.

In view of the above, the combined air-conditioning and hot-water supply system 100 performs the following three control operations so as to maintain a high hot-water supply temperature. Upon performing three control operations, the target condensing temperature of the outdoor unit 110 is changed in accordance with the preset temperature of the hot-water-supply side. The outdoor unit control means 210 that has received the hot-water supply temperature (hereinafter, simply referred to as a "preset temperature"), which is set in the hot-water supply unit 130, through the communication means 231 and the communication means 211 may set the target condensing temperature on the basis of the preset temperature. The target condensing temperature may be set by referring to a relational expression obtained in advance from actual measurements, or a graph shown in FIG. 5 in which the pattern between a preset temperature To (horizontal axis) and the target condensing temperature CTm (vertical axis) is arbitrarily summarized. It is to be noted that, in the case of setting the target condensing temperature on the basis of the graph of FIG. 5, values not shown on the graph may be obtained by linear interpolation.

(1) Control Operation of Maintaining Capacity of Indoor Unit 120 Constant

This control operation is performed by adjusting the opening degree of the indoor expansion device 122. The operation is performed by setting a control opening degree correction factor against the preset temperature of the hot-water supply unit 130 and thereby maintaining the capacity of the indoor expansion device 122 at a constant level. The indoor unit control means 220 that has received the preset temperature through the communication means 231 and the communication means 221 may set the control opening degree correction factor against the preset temperature and thereby control the opening degree of the indoor expansion device 122. More specifically, if the preset temperature is higher than the temperature of the refrigerant discharged from the compressor 111, the target condensing temperature of the outdoor unit 110 may be increased, and the opening degree of the indoor expansion device 122 may be controlled to be reduced (to be changed toward the reduction direction) so as to maintain the heating capacity of the indoor unit 120. It is to be noted that the control opening degree correction factor may be set by referring to a relational expression obtained in advance from actual measurements, or a table or graph in which the relationship between the preset temperature and the opening degree correction factor is summarized in any form.

(2) Control Operation of Delaying Operation of Stopping Indoor Unit 120 and Reducing Frequency Control of Compressor 111 Before Stopping Indoor Unit 120 (FIGS. 4(*a*) and 4(*b*))

This control operation prevents, in the case where the refrigerant condensing temperature is set in accordance with the hot water load, an excessive increase in pressure of refrigerant upon starting and stopping the indoor unit 120 or the hot-water supply unit 130 in response to a load variation.

FIG. 4(*a*) illustrates the flow of an operation of reducing the frequency of the compressor 111 before stopping the indoor unit 120, and stopping the indoor unit 120 after completion of the frequency reduction operation of the compressor 111.

FIG. 4(*b*) illustrates the flow of an operation of waiting for a lapse of an arbitrarily set time period before stopping the indoor unit 120, and then stopping the indoor unit 120.

The flow of the operation of FIG. 4(*a*) will be described in detail.

When conditions for stopping the indoor unit 120 are satisfied (S1), the indoor unit control means 220 transmits an indoor unit stop signal (S2). At this point, the indoor unit 120 maintains the current operational state, and a stop process is not executed (S3). Having received the indoor unit stop signal (S4), the outdoor unit control means 210 reduces the frequency of the compressor 111 (S5), and completes the frequency reduction operation (S6). Then, the outdoor unit control means 210 transmits a signal indicating a completion of the frequency reduction operation of the compressor 111

(S7). Having received the signal indicating a completion of the frequency reduction operation of the compressor 111 (S8), the indoor unit control means 220 stops the indoor unit 120. That is, the indoor unit 120 is stopped after a lapse of a predetermined time period ΔT from when the conditions for stopping the indoor unit 120 are satisfied.

The flow of the operation of FIG. 4(b) will be described in detail.

When conditions for stopping the indoor unit 120 are satisfied (S11), the indoor unit control means 220 transmits an indoor unit stop signal (S12). At this point, the indoor unit control means 220 starts a timer counting (S13). More specifically, a timer counting operation is executed so as to cause the indoor unit 120 to maintain the current operational state until a lapse of the predetermined time period ΔT. It is to be noted that the timer counting operation may be executed by the indoor unit control means 220. The indoor unit control means 220 stops the indoor unit 120 after a lapse of the predetermined time ΔT (S14). On the other hand, the outdoor unit control means 210 receives the indoor unit stop signal (S15), reduces the frequency of the compressor 111 (S16), and completes the reduction operation (S17). It is to be noted that ΔT is set longer than the time required for the frequency reduction operation of the compressor 111.

(3) Control Operation of Maintaining Outlet Water Temperature Constant Using Hot-Water-Supply-Side Expansion Device 132

This control operation controls the hot-water-supply-side expansion device 132 to maintain the outlet water temperature, and thereby prevents thermo-OFF of the hot-water supply unit 130. This control operation is performed in order to further reduce hunting in the high-pressure side. More specifically, the operation is performed by controlling the opening degree of the hot-water-supply-side expansion device 132 on the basis of the difference between the thermo temperature and the preset temperature of the hot-water supply unit 130 or a comparison between these temperatures. That is, by controlling the opening degree of the hot-water-supply-side expansion device 132, the circulation amount of refrigerant flowing into the hot-water supply unit 130 is adjusted, and thus the temperature of water flowing out of the refrigerant-to-water heat exchanger 131 is controlled to be constant.

By performing the control operations described above, even in the case of the combined air-conditioning and hot-water supply system 100 having a single refrigerant circuit system, the hot-water supply unit 130 can supply high-temperature hot water, and the indoor unit 120 can operate with the same air outlet temperature as that under the normal control. It is to be noted that, either of the operations (2) and (3) may be omitted depending on the characteristics of the combined air-conditioning and hot-water supply system 100.

The following describes refrigerants that can be used in the combined air-conditioning and hot-water supply system 100. Examples of refrigerants that can be used in the combined air-conditioning and hot-water supply system 100 include a non-azeotropic refrigerant mixture, a near-azeotropic refrigerant mixture, and a single refrigerant. Examples of non-azeotropic refrigerant mixtures include R407C (R32/R125/R134a) that are HFC (hydrofluorocarbon) refrigerants. Such a non-azeotropic refrigerant mixture is a mixture of refrigerants having different boiling points and, therefore has such characteristics that a liquid phase refrigerant and a gas phase have different composition ratios. Examples of near-azeotropic refrigerant mixtures include R410A (R32/R125) and R404A (R125/R143a/R134a) which are HFC refrigerants. Such a near-azeotropic refrigerant mixture has such characteristics that its operating pressure is approximately 1.6 times as high as that of R22, in addition to the characteristics similar to those of the non-azeotropic refrigerant mixture.

Furthermore, examples of single refrigerants include R22 that is an HCFC (hydrochlorofluorocarbon) refrigerant and R134a that is an HFC refrigerant. Such a single refrigerant is not a mixture, and therefore has such characteristics that it is easy to handle. In addition, natural refrigerants including carbon dioxide, propane, isobutane, and ammonia may be used. It is to be noted that R22 is chlorodifluoromethane; R32 is difluoromethane; R125 is pentafluoromethane; R134a is 1,1,1,2-tetrafluoromethane; and R143a is 1,1,1-trifluoroethane. A refrigerant that suits the purpose and use of the combined air-conditioning and hot-water supply system 100 may therefore be used.

Further, although excess refrigerant is stored in a liquid receiver (the accumulator 114) in the combined air-conditioning and hot-water supply system 100 in the above example, the configuration is not limited to thereto. If a heat exchanger that serves as a radiator in the refrigeration cycle is configured to store excess refrigerant, the accumulator 114 may be omitted. Furthermore, although only one indoor unit 120 is connected in the example of FIG. 1, the number of connected units is not particularly limited. For example, two or more indoor units 120 may be connected. In the case where a plurality of indoor units 120 are provided, the indoor units 120 may have the same capacity, or may have different capacities ranging from high to low.

As described above, in the combined air-conditioning and hot-water supply system 100 according to Embodiment, it is possible to perform autonomous distributed control while maintaining the hot-water supply temperature high during a heating cycle. That is, in the combined air-conditioning and hot-water supply system 100, if the preset temperature in the hot-water supply unit 130 is high, the target condensing temperature of the outdoor unit 110 is increased, and the opening degree of the indoor expansion device 122 is controlled to be reduced so as to maintain the heating capacity of the indoor unit 120. This makes it possible to perform capacity control at the initiative of the hot-water-supply side, and allows the preset temperature for hot-water supply to be maintained high. Accordingly, it is possible to perform high-temperature hot-water supply control even under the conditions where the outdoor unit 110, the indoor unit 120, and the hot-water supply unit 130 operate independently of each other.

REFERENCE SIGNS LIST

100: combined air-conditioning and hot-water supply system, 101: gas main pipe, 102: liquid main pipe, 103: water pipe, 104: water circuit, 110: outdoor unit, 111: compressor, 112: switching valve, 113: outdoor heat exchanger, 114: accumulator, 115: air-sending device, 120: indoor unit, 121: indoor heat exchanger, 122: indoor expansion device, 130: hot-water supply unit, 131: refrigerant-to-water heat exchanger, 132: hot-water-supply-side expansion device, 200: control means, 210: outdoor unit control means, 211: communication means, 220: indoor unit control means, 221: communication means, 230: hot-water supply unit control means, 231: communication means, 240: operation signal receiving means, 250: storing means, 260: temperature information detecting means, 270: thermo determining means, 280: indoor unit stop determining means, 290:

backup means, 291: arithmetic circuit, 292: delay circuit, 293: indoor unit stopping means.

The invention claimed is:

1. A combined air-conditioning and hot-water supply system comprising:
    at least one outdoor unit including a compressor and an outdoor heat exchanger;
    at least one indoor unit connected to the outdoor unit, the indoor unit including an indoor heat exchanger and an indoor expansion device;
    at least one hot-water supply unit connected to the outdoor unit so as to be arranged in parallel to the indoor unit, the hot-water supply unit including a refrigerant-to-water heat exchanger and a hot-water-supply-side expansion device, and
    a controller configured to control the outdoor unit, the indoor unit, and the hot-water supply unit to perform a plurality of control operations including a first control operation and a second control operation, wherein
    the controller is configured to perform the first control operation to operate the combined air-conditioning and hot-water supply system so as to achieve a target condensing temperature that is set in the outdoor unit and to maintain a heating load of the indoor unit,
    the controller operates the first control operation when the indoor unit performs a heating operation and the hot-water supply unit performs a hot-water supply operation, and if a temperature that is set in the hot-water supply unit is higher than a temperature of refrigerant discharged from the compressor,
    in the first control operation, the controller is configured to increase the target condensing temperature of the outdoor unit above the target condensing temperature that has been set, and to control an opening degree of the indoor expansion device to be less than the opening degree that has been set, such that the heating load of the indoor unit is maintained constant, and
    the controller is configured to perform the second control operation upon individually stopping the indoor unit or the hot-water supply unit in order to prevent a refrigerant pressure increase, in the second control operation, the controller is configured to reduce a frequency of the compressor below a current frequency to a nonzero frequency before stopping the indoor unit or the hot-water supply unit, and then to stop the indoor unit or the hot-water supply unit.

2. The combined air-conditioning and hot-water supply system of claim 1, wherein the controller is configured to stop the indoor unit or the hot-water supply unit after receiving information indicating a completion of an operation of reducing the frequency of the compressor below the current frequency from the outdoor unit.

3. The combined air-conditioning and hot-water supply system of claim 1, wherein the controller is configured to stop the indoor unit or the hot-water supply unit after a lapse of a time period equal to or greater than a time period taken to complete an operation of reducing the frequency of the compressor below the current frequency.

4. The combined air-conditioning and hot-water supply system of claim 1, wherein the controller is configured to adjust a temperature of water flowing out of the refrigerant-to-water heat exchanger to be constant by controlling an opening degree of the hot-water-supply-side expansion device.

5. The combined air-conditioning and hot-water supply system of claim 1, wherein the controller further comprises
    an operation signal receiver configured to receive an indoor unit stop signal and to transmit an indoor unit operation information signal,
    an indoor unit stop determining module electrically connected to the operation signal receiver and configured to determine whether to stop the indoor unit, to receive the indoor unit operation information signal from the operation signal receiver, and to transmit a stop signal,
    a thermo-temperature setting and storing module that is configured to receive a preset temperature signal and to transmit a thermo-temperature information signal,
    a thermo determining module electrically connected to the thermo-temperature setting and storage module and to the indoor unit stop determining module and configured to determine the temperature state of the indoor unit and to receive the thermo-temperature information signal from the thermo-temperature setting and storing module and to transmit a thermo determining information signal to the indoor unit stop determining module, and
    a temperature information detector electrically connected to the thermo determining module and configured to receive a temperature signal and to transmit a temperature information signal to the thermo determining module.

6. The combined air-conditioning and hot-water supply system of claim 5, wherein the controller further comprises
    a backup module electrically connected to the indoor unit stop determining module and including
        an arithmetic circuit configured to determine the operating frequency of the compressor, to receive a stop signal from the indoor unit stop determining module, to transmit a delay time until stop signal, and to transmit a reduce compressor frequency signal to the compressor,
        a delay circuit electrically connected to the arithmetic circuit and configured to delay stopping of the indoor unit, to receive the delay time until stop signal from the arithmetic circuit and to transmit a stop signal, and
        an indoor unit stop module electrically connected to the delay circuit and configured to stop the indoor unit, and to receive the stop signal from the delay circuit and to transmit a stop indoor unit signal to the indoor unit.

7. The combined air-conditioning and hot-water supply system of claim 1, wherein the controller further comprises
    a backup module including
        an arithmetic circuit configured to determine the operating frequency of the compressor, to receive a stop signal, to transmit a delay time until stop signal, and to transmit a reduce compressor frequency signal to the compressor,
        a delay circuit electrically connected to the arithmetic circuit and configured to delay stopping of the indoor unit, to receive the delay time until stop signal from the arithmetic circuit and to transmit a stop signal, and
        an indoor unit stop module electrically connected to the delay circuit and configured to stop the indoor unit, and to receive the stop signal from the delay circuit and to transmit a stop indoor unit signal to the indoor unit.

8. The combined air-conditioning and hot-water supply system of claim 1, wherein the controller is a microcomputer.

9. The combined air-conditioning and hot-water supply system of claim 1, wherein the controller is a digital signal processor.

\* \* \* \* \*